(12) United States Patent  (10) Patent No.: US 9,279,717 B2
Miyazaki et al.  (45) Date of Patent: Mar. 8, 2016

(54) MULTIDIRECTIONAL INPUT DEVICE

(71) Applicant: PANASONIC CORPORATION, Osaka (JP)

(72) Inventors: Tatsuya Miyazaki, Fukui (JP); Hideaki Eto, Fukui (JP); Yosuke Ohashi, Fukui (JP); Takeshi Miyaoka, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 214 days.

(21) Appl. No.: 14/185,659

(22) Filed: Feb. 20, 2014

(65) Prior Publication Data
US 2014/0239163 A1 Aug. 28, 2014

(30) Foreign Application Priority Data

Feb. 28, 2013 (JP) .................................. 2013-038389

(51) Int. Cl.
*G01J 1/02* (2006.01)
*G05G 9/047* (2006.01)
(52) U.S. Cl.
CPC ............... *G01J 1/0271* (2013.01); *G05G 9/047* (2013.01); *G05G 2009/04759* (2013.01)

(58) Field of Classification Search
CPC .................. G01J 1/0271; G05G 9/047; G05G 2009/04759
See application file for complete search history.

(56) References Cited

U.S. PATENT DOCUMENTS

2009/0134003 A1 5/2009 Okidate

FOREIGN PATENT DOCUMENTS

JP 2008-146968 A 6/2008
JP 2009-129871 A 6/2009

*Primary Examiner* — Renee D Chavez
(74) *Attorney, Agent, or Firm* — McDermott Will & Emery LLP

(57) ABSTRACT

A multidirectional input device includes a case; a slider slidable in a first direction and mounted to the case; a movable member mounted on an upper surface of the slider so as to be slidable in a second direction; a first reflection portion provided on any one of the movable member, the case, and the slider; a first light-emitting device arranged to be opposite to the first reflection portion; and a first light-receiving device arranged to be opposite to the first reflection portion, wherein the first reflection portion has a plurality of steps confronting the side facing the first light-emitting device, and a distance between the first reflection portion and the first light-emitting device in a third direction varies according to an area.

5 Claims, 18 Drawing Sheets first direction
second direction
third direction

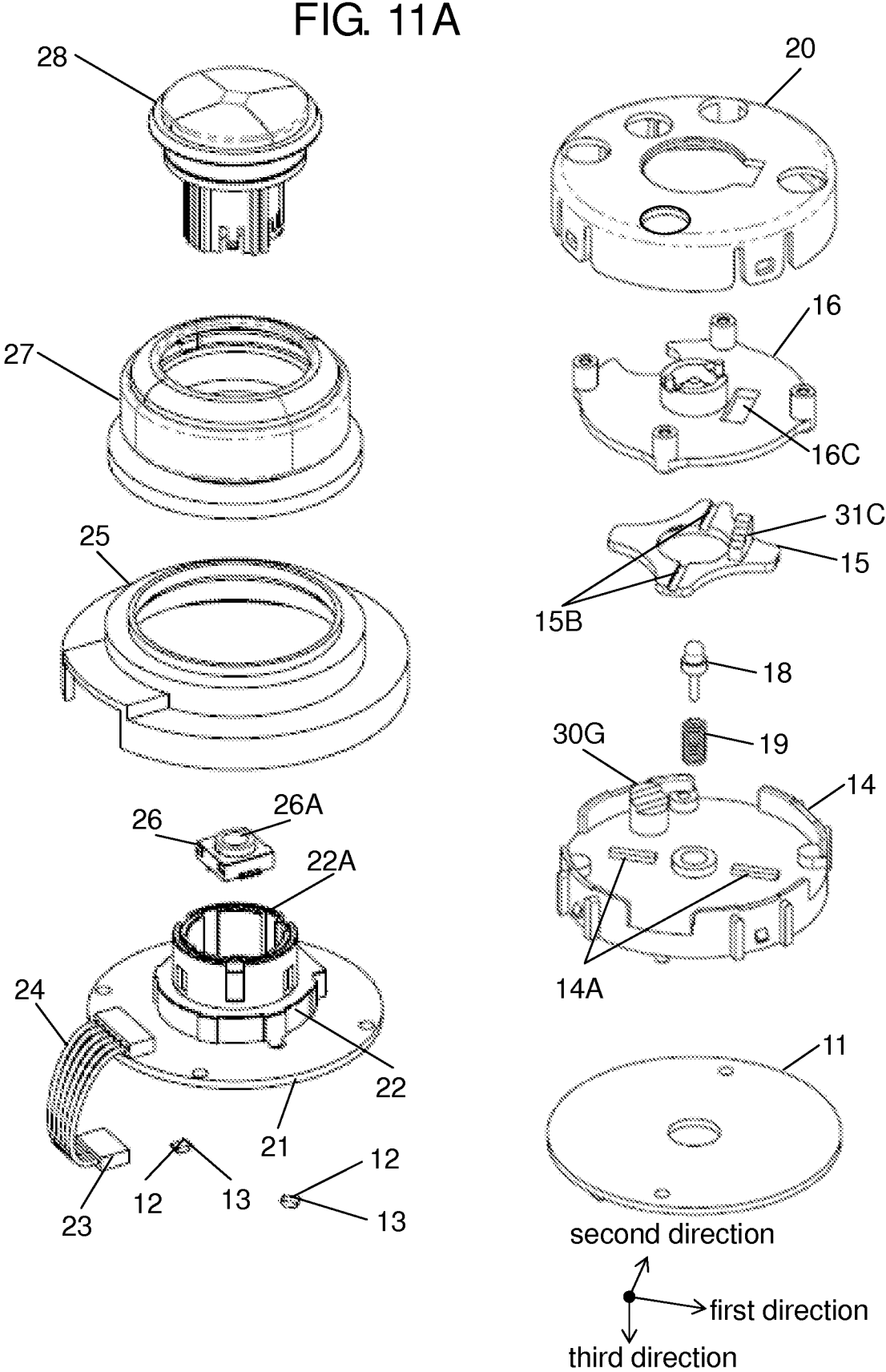

MULTIDIRECTIONAL INPUT DEVICE

RELATED APPLICATIONS

This application claims the benefit of Japanese Application No. 2013-038389, filed on Feb. 28, 2013, the disclosures of which Application is incorporated by reference herein.

BACKGROUND OF THE INVENTION

1. Field of the Invention

The present invention relates to a multidirectional input device used mainly for an operation of various electronic devices in an automobile.

2. Description of the Related Art

Recently, a multidirectional input device that can be operated in various ways, i.e., that can be allowed to turn, to be pushed, or to slide, is provided on an instrument panel or a console box in a vehicle compartment. Multidirectional input devices that operate various electronic devices in a vehicle compartment, such as a car navigation system, an audio, or an air conditioner, have been increasing, and there is a demand for a multidirectional input device that enables various and reliable operations.

A conventional multidirectional input device will be described with reference to FIG. 13.

FIG. 13 is a perspective view of a conventional multidirectional input device. Cover 1, operation body 2, and push button 3 are made of insulating resin. Operation body 2 is mounted on a top surface of cover 1 so as to enable the turning operation and the sliding operation of operation body 2. Push button 3 is mounted at the center of the top surface of operation body 2 so as to vertically move.

Although not illustrated, a rotary operation type electronic component, a push switch, a movable member, a slider, and detection switches are housed in cover 1, and these components form a multidirectional input device. Operation body 2 is mounted to the rotary operation type electronic component such as an encoder, and a lower end of push button 3 is in contact with the push switch. The movable member and the slider slide the push switch and the operation body longitudinally and horizontally. Alternatively, the detection switches detect the sliding direction.

The multidirectional input device thus configured is mounted on a console box, which is provided, for example, on the side of a driver's seat in an automobile, in such a manner that operation body 2 and push button 3 protrude upward. The rotary operation type electronic component, the push switch, and the detection switches are electrically connected to an electronic circuit (not illustrated) in an automobile through connectors or lead wires (not illustrated).

In the conventional multidirectional input device, when a driver slides operation body 2 in various directions, i.e., in a front-back direction and horizontal direction, with plural menus being displayed on a liquid crystal display panel (not illustrated) of the car navigation system, for example, on the front of the driver's seat, a moving contact and a fixed contact of the detection switch in the operated direction, out of the plural detection switches, are connected or disconnected to electrically connect or disconnect the detection switch.

Electric signals outputted from the plural detection switches are outputted to the electronic circuit in the automobile, and the electronic circuit detects the sliding direction of operation body 2, whereby a cursor or a pointer displayed on the liquid crystal display panel moves in the operation direction on the plural menus to select a desired menu.

When the driver pushes the push button 3 after selecting the desired menu by the sliding operation of operation body 2 as described above, the push switch below push button 3 is electrically connected or disconnected. The electronic circuit detects whether push button 3 is electrically connected or disconnected, whereby the selected menu is determined.

When the driver turns operation body 2 with a map being displayed on the liquid crystal display panel, the rotary operation type electronic component such as the encoder is electrically connected or disconnected. The electronic circuit detects whether the rotary operation type electronic component is electrically connected or disconnected, whereby the map is displayed as enlarged or reduced.

In this way, various devices in the automobile can be operated by sliding, depressing, or turning operation body 2 or push button 3 of the multidirectional input device mounted on the console box or the like located near the driver.

See Unexamined Japanese Patent Publication No. 2008-146968 as information on prior art documents relating to the invention of this application.

SUMMARY OF THE INVENTION

However, the conventional multidirectional input device needs many detection switches, since the operation direction of operation body 2 is detected by the electrical connection and disconnection of plural detection switches during the sliding operation of operation body 2. In other words, the conventional multidirectional input device has a problem of complicated configuration.

The present invention aims to solve the problem of the conventional device, and to provide a multidirectional input device that enables various and reliable operations with a simple configuration.

In order to attain the foregoing object, a multidirectional input device according to one aspect includes a case; a slider slidable in a first direction and mounted to the case; a movable member mounted on an upper surface of the slider so as to be slidable in a second direction; a first reflection portion provided on any one of the movable member, the case, and the slider; a first light-emitting device arranged to be opposite to the first reflection portion; and a first light-receiving device arranged to be opposite to the first reflection portion, wherein the first reflection portion has a plurality of steps confronting the first light-emitting device, and a distance between the first reflection portion and the first light-emitting device in a third direction varies depending on an area.

According to this configuration, the sliding direction of the movable member can be detected by a pair of the light-emitting device and the light-receiving device. The multidirectional input device can be easily formed by using reduced number of components, and perform detection in a non-contact manner by reflected light from the reflection portion, thereby being capable of realizing a reliable operation even after a long-term use and frequent use.

The present invention can provide a multidirectional input device that enables various and reliable operations with a simple configuration.

BRIEF DESCRIPTION OF DRAWINGS

FIG. 11A is an exploded perspective view illustrating a multidirectional input device according to a sixth exemplary embodiment of the present invention;

DETAILED DESCRIPTION OF THE PREFERRED EMBODIMENTS

Exemplary embodiments of the present invention will be described below with reference to the drawings.

First Exemplary Embodiment

Figure 1:
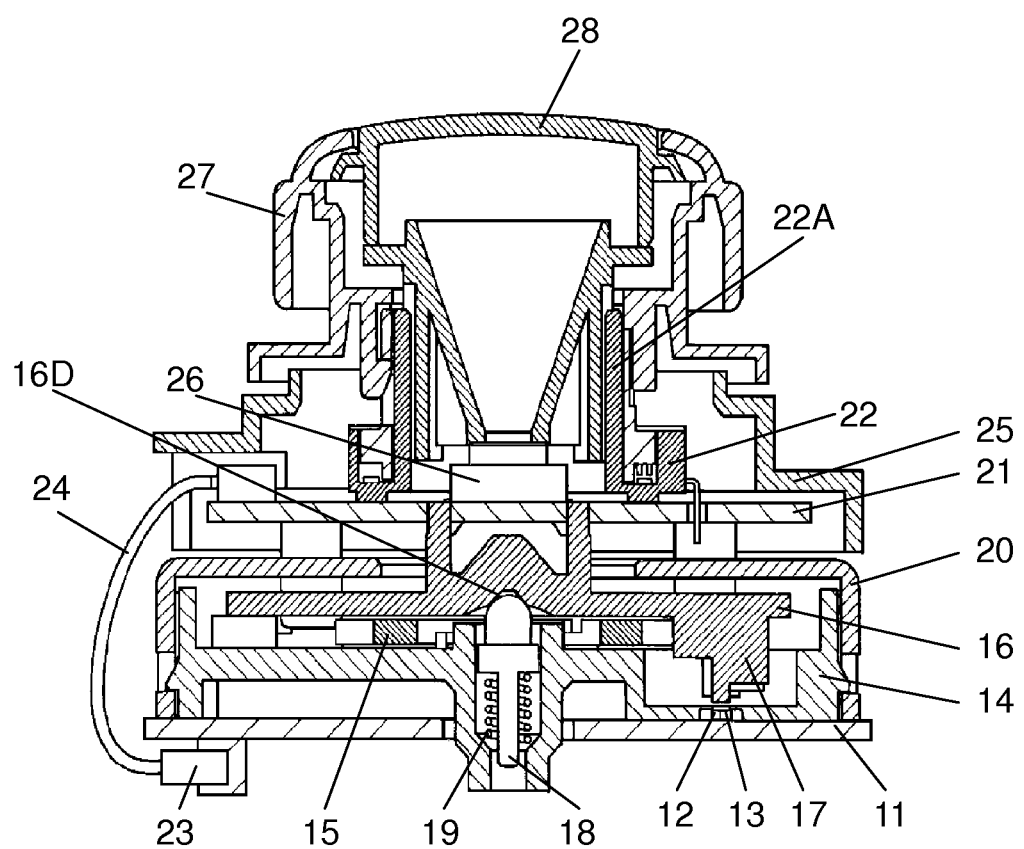
FIG. 1 is a sectional view illustrating a multidirectional input device according to a first exemplary embodiment of the present invention.
Figure 2:
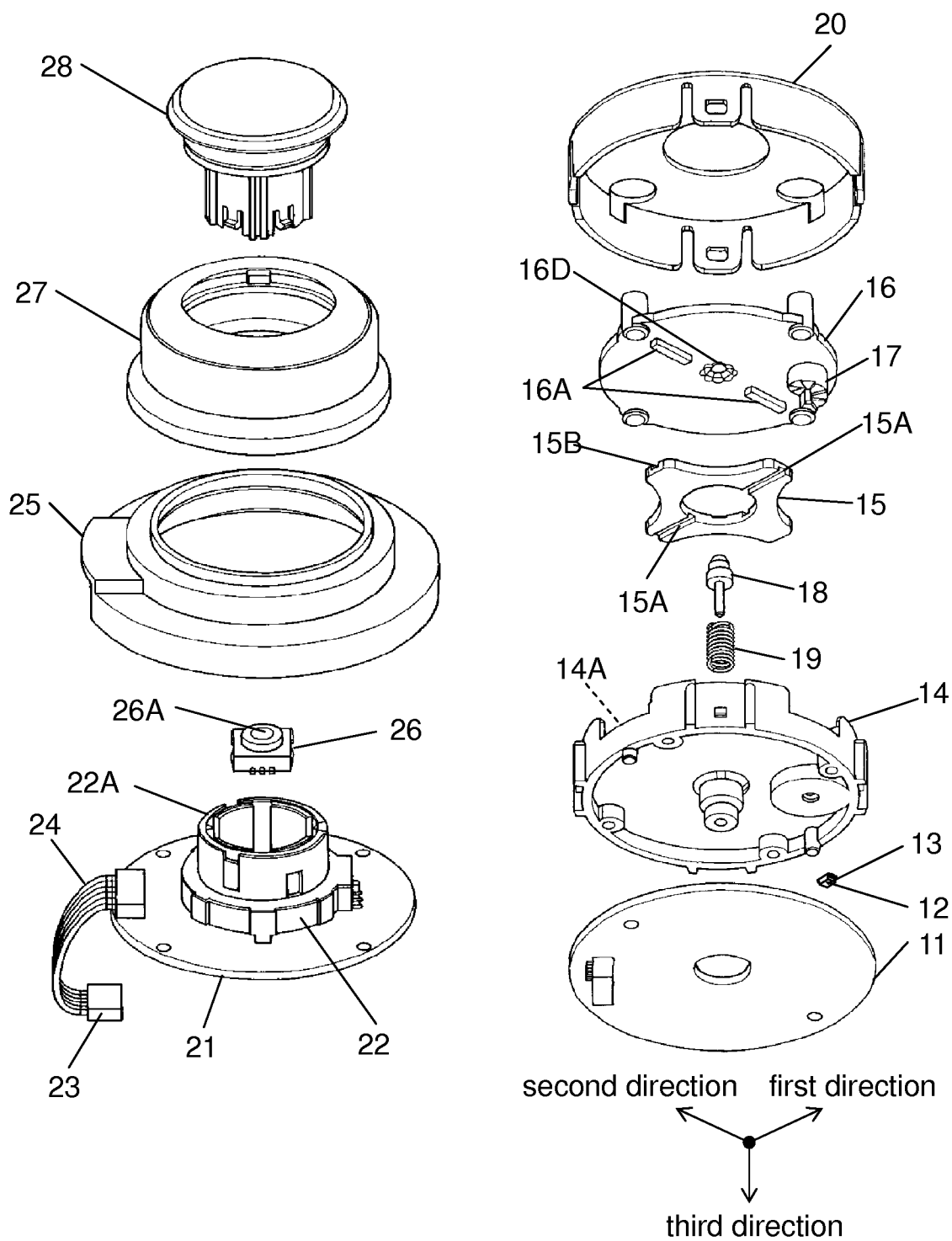
FIG. 2 is an exploded perspective view illustrating the multidirectional input device according to the first exemplary embodiment of the present invention.

FIG. 1 is a sectional view of a multidirectional input device according to the first exemplary embodiment of the present invention. FIG. 2 is an exploded perspective view illustrating the multidirectional input device in FIG. 1. The figure on the left part in FIG. 2 is an exploded perspective view of the multidirectional input device viewed from diagonally above, while the figure on the right part in FIG. 2 is an exploded perspective view of the multidirectional input device viewed from diagonally below.

Lower wiring board 11 is made of paper phenol or glass epoxy. Multiple wiring patterns (not illustrated) are formed on upper and lower surfaces of lower wiring board 11 by use of copper foil. A pair of light-emitting device 12 and light-receiving device 13 is mounted on the upper surface of lower wiring board 11. Light-emitting device 12 is made of a light-emitting diode, and light-receiving device 13 is made of a phototransistor.

Figure 3A:
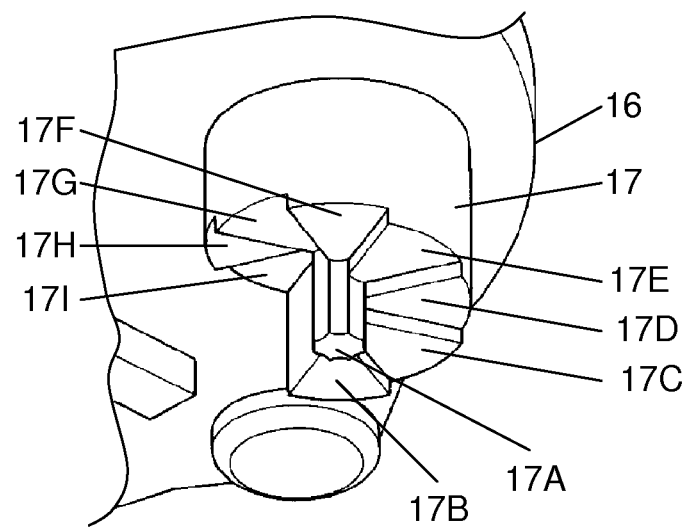
FIG. 3A is a perspective view illustrating a reflection portion of the multidirectional input device according to the first exemplary embodiment of the present invention.
Figure 3B:
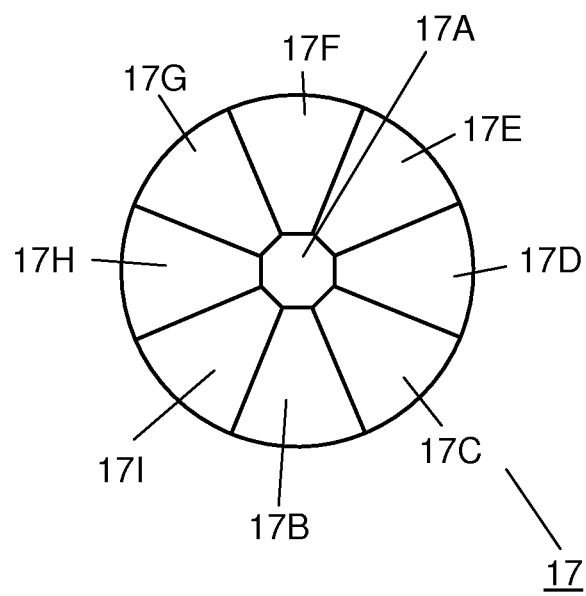
FIG. 3B is a plan view illustrating the reflection portion of the multidirectional input device according to the first exemplary embodiment of the present invention.
Figure 3C:
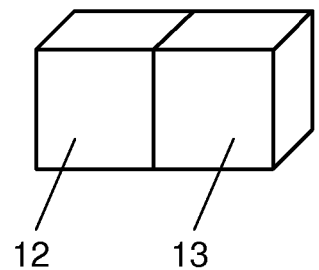
FIG. 3C is a perspective view illustrating a light-emitting device and a light-receiving device in the multidirectional input device according to the first exemplary embodiment of the present invention.

Although FIG. 2 illustrates that light-emitting device 12 and light-receiving device 13 are formed integrally, light-emitting device 12 and light-receiving device 13 are independent components as illustrated in FIG. 3C.

Case 14 has a disk-like shape, and is made of insulating resin such as polycarbonate or ABS. Slider 15 is made of insulating resin such as polyoxymethylene or polybutylene terephthalate. Lower wiring board 11 is fixed on the lower surface of case 14, and wall portions 14A (not illustrated in FIG. 2, since FIG. 2 is the perspective view from below) formed on the upper surface of case 14 are inserted into grooves 15A formed to extend in a first direction on the lower surface of slider 15. This structure allows slider 15 to be mounted slidably in the first direction on the upper surface of case 14. The wall portions 14A formed on the upper surface of case 14 have a bar-like shape similar to wall portions 16A, and the wall portions formed on the upper surface of case 14 have a bar-like shape extending in the first direction.

Movable member 16 is made of insulating resin such as polybutylene terephthalate or polyoxymethylene, and wall portions 16A are formed on a lower surface of movable member 16. Wall portions 16A have a bar-like shape extending in a second direction. Movable member 16 is mounted slidably in the second direction on an upper surface of slider 15 by inserting wall portions 16A into groove portions 15B formed on the upper surface of slider 15. The shape of groove portion 15B formed on the upper surface of slider 15 is the same as the shape of groove portion 15A formed on the lower surface of slider 15.

Accordingly, slider 15 is mounted slidably in the first direction on the upper surface of case 14, and movable member 16 is mounted slidably in the second direction on the upper surface of slider 15, whereby movable member 16 can slide relative to case 14 via slider 15 not only in the horizontal direction and front-back direction but also in any directions with the rotation thereof being restricted.

Reflection portion 17 is formed on the lower surface of movable member 16. The detail of reflection portion 17 will be described below with reference to FIGS. 3A and 3B.

As illustrated in the perspective view of FIG. 3A, reflection portion 17 includes plural plane portions 17A to 17I formed in spiral steps. FIG. 3B is a view of reflection portion 17 viewed from below, wherein plural areas, each having a different height, are radially arranged about a predetermined position. As illustrated in FIG. 1, light-emitting device 12 and light-receiving device 13 are arranged below reflection portion 17 to face reflection portion 17 with a predetermined space.

It is not limited that reflection portion 17 has steps gradually increasing or decreasing in height in spiral steps, but reflection portion 17 may have plural areas irregularly and radially arranged, each area having a different height.

Pin 18 is made of insulating resin such as polybutylene terephthalate or polyoxymethylene. Spring 19 is made of steel wire or copper alloy wire. Spring 19 wound in a coil is stored in case 14 in slightly deflected state. An upper end of pin 18 biased by spring 19 elastically contacts cam portion 16D on the lower surface of movable member 16.

Lower cover 20 is made of insulating resin such as polycarbonate or ABS, and upper wiring board 21 is the same as lower wiring board 11. Lower cover 20 is fixed to case 14, and lower cover 20 covers movable member 16 and slider 15. Upper wiring board 21 is fixed to the upper end of movable member 16 projecting from plural holes formed on the upper surface of lower cover 20, whereby upper wiring board 21 and movable member 16 are formed integrally.

Rotary operation type electronic component 22 such as an encoder or a variable resistor is mounted on the upper surface of upper wiring board 21, and upper wiring board 21 and lower wiring board 11 are electrically connected by plural connectors 23 and lead wires 24.

Upper cover 25 is made of a material same as the material of lower cover 20.

Upper cover 25 covers upper wiring board 21, rotary operation type electronic component 22, and the like. Cylindrical hollow shaft 22A of rotary operation type electronic component 22 projects from the hole on the center of upper cover 25, and push switch 26 is mounted on an upper surface of upper wiring board 21 in hollow shaft 22A.

Operation body 27 is made of insulating resin such as polycarbonate or ABS. An edge of operation body 27 on the middle part is fixed to an outer periphery of hollow shaft 22A of rotary operation type electronic component 22, and operation body 27 is mounted rotatably and slidably on the upper surface of upper cover 25.

Push button 28 is made of insulating resin such as polycarbonate or ABS, and a lower end of push button 28 on the central part contacts pressure shaft 26A of push switch 26. Push button 28 is mounted in operation body 27, so that push button 28 can move vertically. Thus, the multidirectional input device according to the first exemplary embodiment of the present invention is configured.

The multidirectional input device is mounted on a console box, which is arranged at the side of a driver's seat, for example, in an automobile with operation body 27 and push button 28 projecting upward, wherein light-emitting device 12, light-receiving device 13, rotary operation type electronic component 22, and push switch 26 are electrically connected to an electronic circuit (not illustrated) in the automobile via connectors or lead wires (not illustrated).

Subsequently, reflection portion 17, light-emitting device 12, and light-receiving device 13 will be described in detail with reference to FIGS. 1, 3A, 3B, 4A to 4C, 5, and 6.

FIG. 3A is a perspective view of reflection portion 17, while FIG. 3B is a plan view of reflection portion 17 viewed from below. As illustrated in FIG. 3A, reflection portion 17 includes nine plane portions 17A to 17I, each having a different height.

Figure 4A:
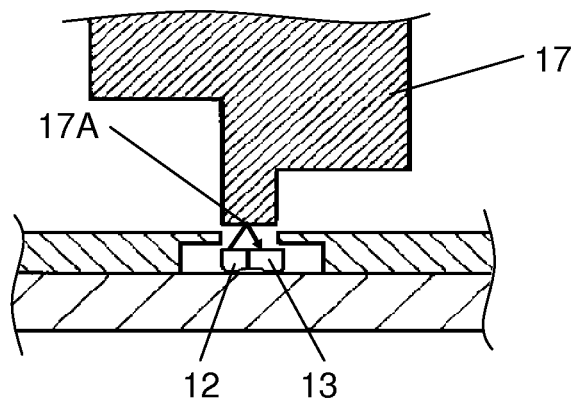
FIG. 4A is a sectional view illustrating a part of the multidirectional input device according to the first exemplary embodiment of the present invention.
Figure 4B:
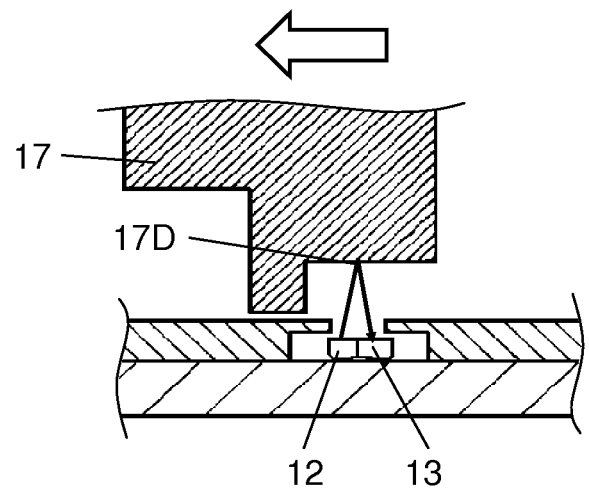
FIG. 4B is a sectional view illustrating a part of the multidirectional input device according to the first exemplary embodiment of the present invention.
Figure 4C:
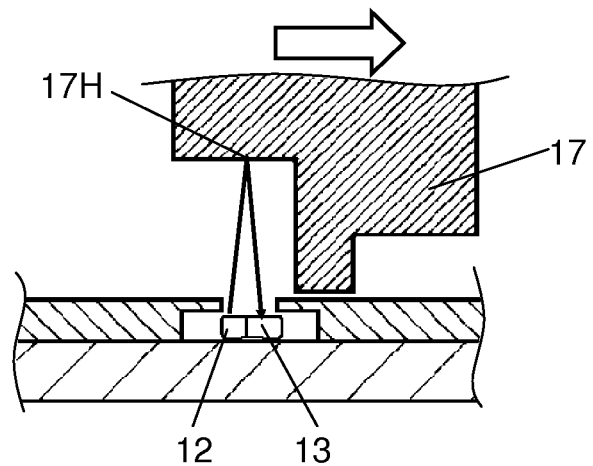
FIG. 4C is a sectional view illustrating a part of the multidirectional input device according to the first exemplary embodiment of the present invention.

FIGS. 4A to 4C are sectional views illustrating a part of the multidirectional input device.

FIGS. 1 and 4A illustrate that the upper end of pin 18 elastically contacts the central part of cam portion 16D, since operation body 27 is not operated. This brings movable member 16 into a neutral state. In the state illustrated in FIGS. 1 and 4A, light-emitting device 12 and light-receiving device 13 are arranged opposite to plane portion 17A, which is located on the lowermost end of reflection portion 17, whereby the distance between reflection portion 17 and light-emitting device 12 as well as light-receiving device 13 is the smallest. When voltage is applied from the electronic circuit to allow light-emitting device 12 to emit light in this state, light from light-emitting device 12 is reflected on plane portion 17A, so that the reflected light received by light-receiving device 13 becomes strong. The voltage according to the reflected light received by light-receiving device 13 is outputted to the electronic circuit from light-receiving device 13, whereby the electronic circuit detects that operation body 27 and movable member 16 are in their neutral position.

Figure 5:
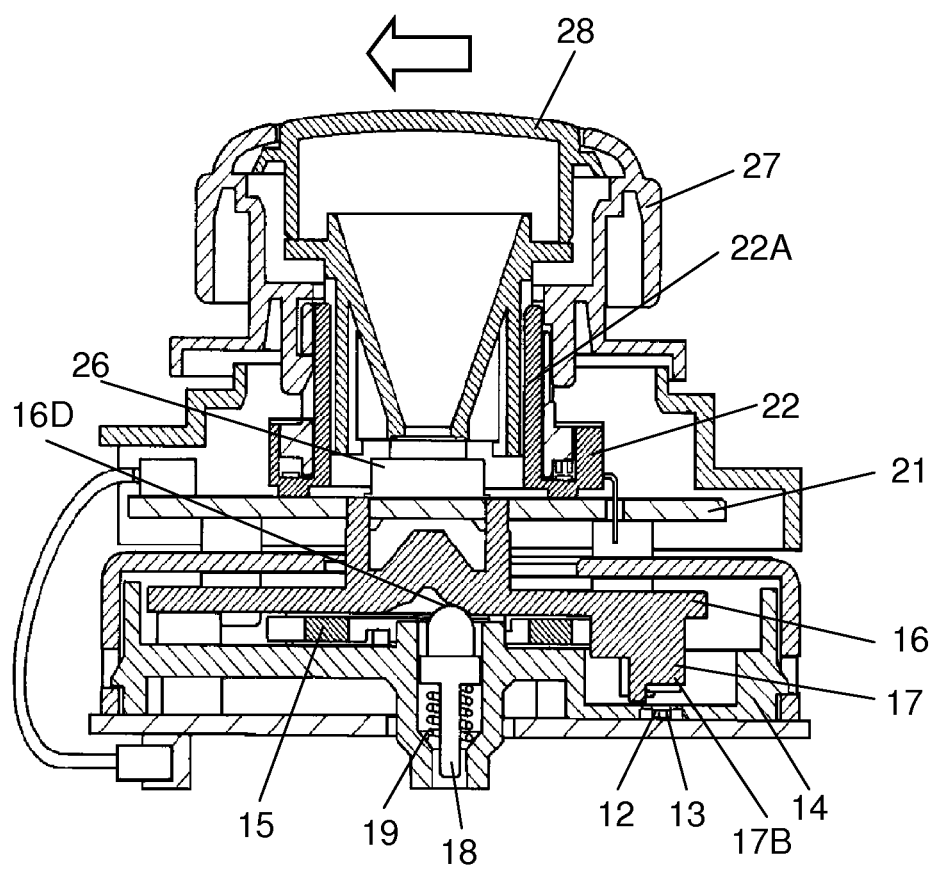
FIG. 5 is a sectional view illustrating the multidirectional input device according to the first exemplary embodiment of the present invention.

FIGS. 4B and 5 illustrate that a driver manually operates to slide operation body 27 to the left with plural menus being displayed on a liquid crystal display panel (not illustrated) of a car navigation system, for example, on the front of the driver's seat.

As illustrated in the sectional view of FIG. 5, when the driver operates to slide operation body 27 to the left, movable member 16 slides to the left on case 14 together with rotary operation type electronic component 22, upper wiring board 21, and slider 15.

As illustrated in FIG. 4B, reflection portion 17 also moves to the left with the leftward sliding motion of movable member 16, whereby plane portion 17D faces light-emitting device 12 and light-receiving device 13, plane portion 17D having slightly larger distance from both devices. Therefore, reflected light reflected on plane portion 17D and received by light-receiving device 13 becomes slightly weak. The voltage according to the reflected light received by light-receiving device 13 is outputted to the electronic circuit from light-receiving device 13, whereby the electronic circuit detects that operation body 27 and movable member 16 slide to the left.

Figure 6:
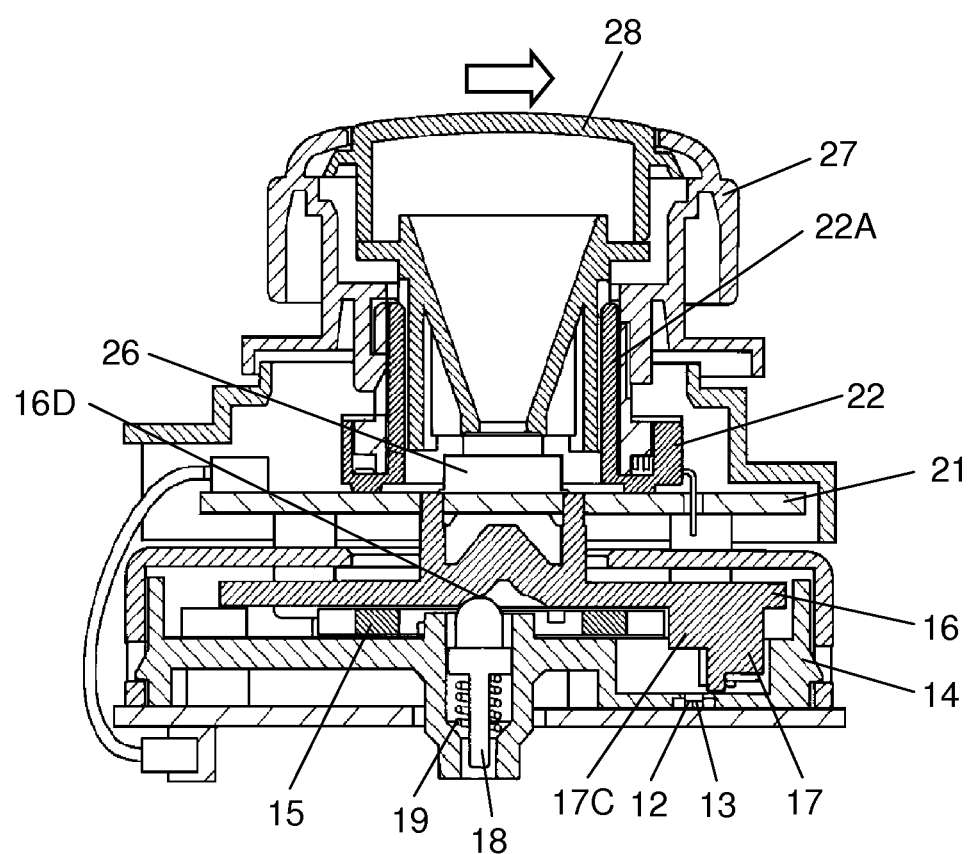
FIG. 6 is a sectional view illustrating the multidirectional input device according to the first exemplary embodiment of the present invention.

FIGS. 4C and 6 illustrate the case of rightward sliding motion. As illustrated in the sectional view in FIG. 6, when the driver operates to slide operation body 27 to the right, movable member 16 slides to the right on case 14.

As illustrated in FIG. 4C, reflection portion 17 also moves to the right with the rightward sliding motion of movable member 16, whereby plane portion 17H faces light-emitting device 12 and light-receiving device 13, plane portion 17H having much larger distance from both devices. Therefore, reflected light reflected on plane portion 17H and received by light-receiving device 13 becomes weaker. The voltage according to the reflected light received by light-receiving device 13 is outputted to the electronic circuit from light-receiving device 13, whereby the electronic circuit detects that operation body 27 and movable member 16 slide to the right.

When the driver operates to slide operation body 27 in the front-back direction, plane portion 17B or plane portion 17F faces light-emitting device 12 and light-receiving device 13 respectively. When the driver operates to slide operation body 27 in an oblique direction, plane portion 17C, 17E, 17G, and 17I face light-emitting device 12 and light-receiving device 13 respectively. Each of plane portions 17C, 17E, 17G, and 17I has different distance to light-emitting device 12 and light-receiving device 13. Therefore, due to the sliding operation, quantity of the reflected light received by light-receiving device 13 changes, so that different voltage is outputted to the electronic circuit.

The electronic circuit can detect which direction operation body 27 or movable member 16 is slidably operated from the voltage according to the reflected light received by light-receiving device 13. A cursor or pointer displayed on the liquid crystal display panel is moved in the operation direction on the plural menus according to the detection result, in order to select a desired menu.

In the multidirectional input device according to the present exemplary embodiment, a pair of light-emitting device 12 and light-receiving device 13 can detect the sliding direction of operation body 27 or movable member 16. The multidirectional input device can detect the sliding direction in a non-contact manner by the intensity of the reflected light from plural plane portions 17A to 17I of stepwise reflection portion 17, not by a mechanical or electrical connection or disconnection between moving contacts and fixed contacts such as plural detection switches.

In this case, the upper end of pin 18 biased by spring 19 elastically contacts the predetermined portion of cam portion 16D on the lower surface of movable member 16 according to the sliding operation, whereby the multidirectional sliding operation is carried out with satisfactory and moderate operational feeling.

When the driver pushes push button 28 on the center of operation body 27 after selecting the desired menu by the sliding operation of operation body 27, the central lower end of push button 28 pushes pressure shaft 26A to establish electrical connection or disconnection of push switch 26. The electronic circuit detects the electrical connection or disconnection of push switch 26, whereby the selected menu is determined.

Next, another operation of operation body 27 will be described. When operation body 27 is turned with a map or the like being displayed on the liquid crystal display panel, hollow shaft 22A rotates to change a resistance value of rotary operation type electronic component 22 or to establish electrical connection or disconnection of rotary operation type electronic component 22. The electronic circuit detects such operation to enlarge or reduce the displayed map, for example.

As described above, the multidirectional input device is configured such that various devices in the automobile can be operated by the sliding operation, pushing operation, or turning operation of operation body 27 or push button 28 of the multidirectional input device mounted on the console box near the driver.

In the present exemplary embodiment, stepwise reflection portion 17 including steps is provided on the lower surface of movable member 16 mounted slidably in multiple directions on case 14 via slider 15. In addition, in the present exemplary embodiment, light-emitting device 12 and light-receiving device 13 are arranged opposite to reflection portion 17 in order to detect the sliding direction of operation body 27 and movable member 16 only by the pair of light-emitting device 12 and light-receiving device 13. This configuration eliminates the need of plural detection switches for detecting the sliding direction, resulting in that the number of components can be reduced, and the multidirectional input device can be formed with a simple configuration.

The multidirectional input device can detect the sliding direction in a non-contact manner by the reflected light, which is emitted from light-emitting device 12 and reflected by plural plane portions 17A to 17I of substantially stepwise reflection portion 17, not by a mechanical or electrical connection or disconnection caused by the contact and separation between moving contacts and fixed contacts of plural detection switches. Consequently, the multidirectional input device according to the present exemplary embodiment can realize a reliable operation even after a long-term use and frequent use.

Second Exemplary Embodiment

Figure 7A:
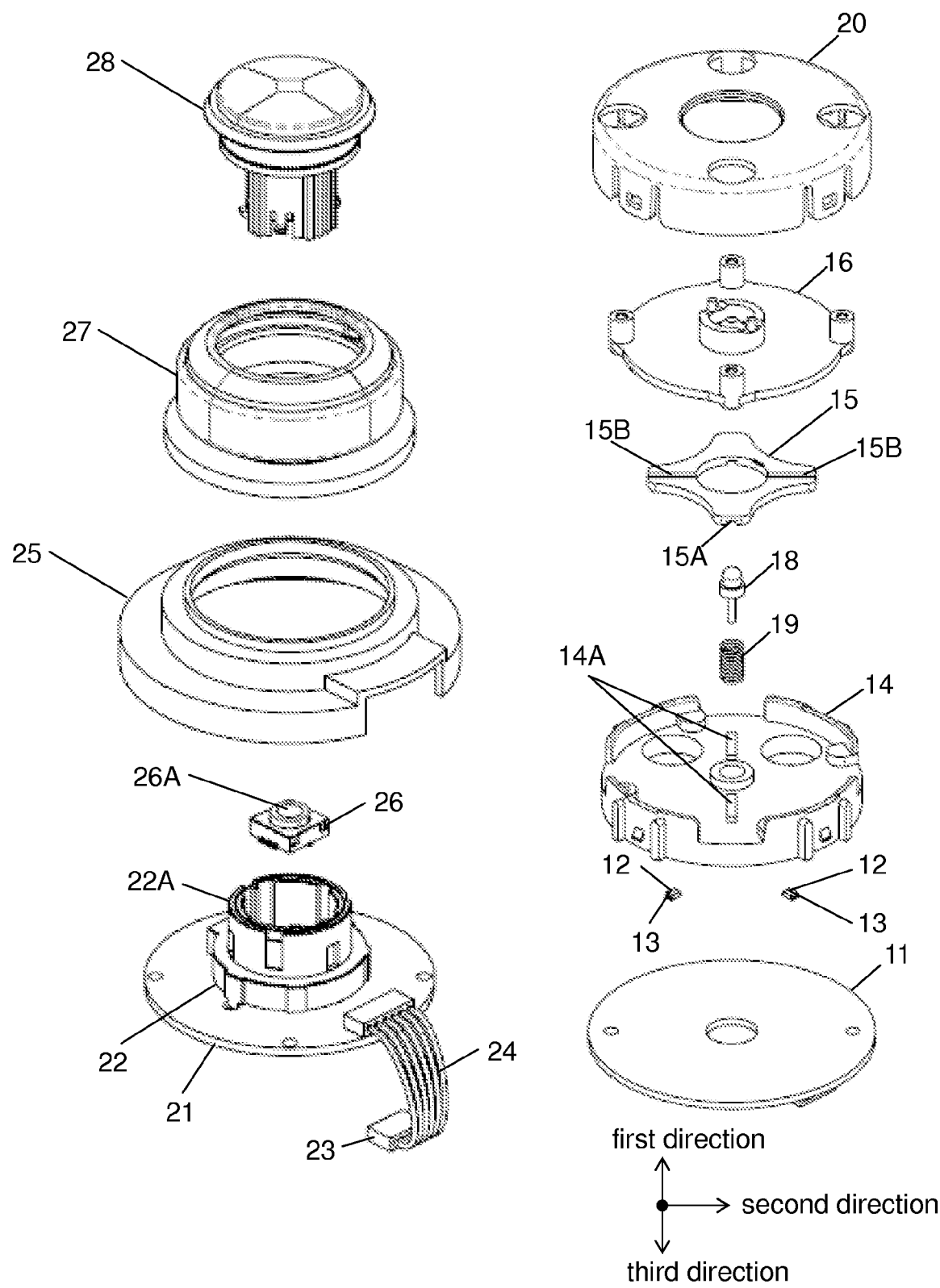
FIG. 7A is an exploded perspective view illustrating a multidirectional input device according to a second exemplary embodiment of the present invention.
Figure 7B:
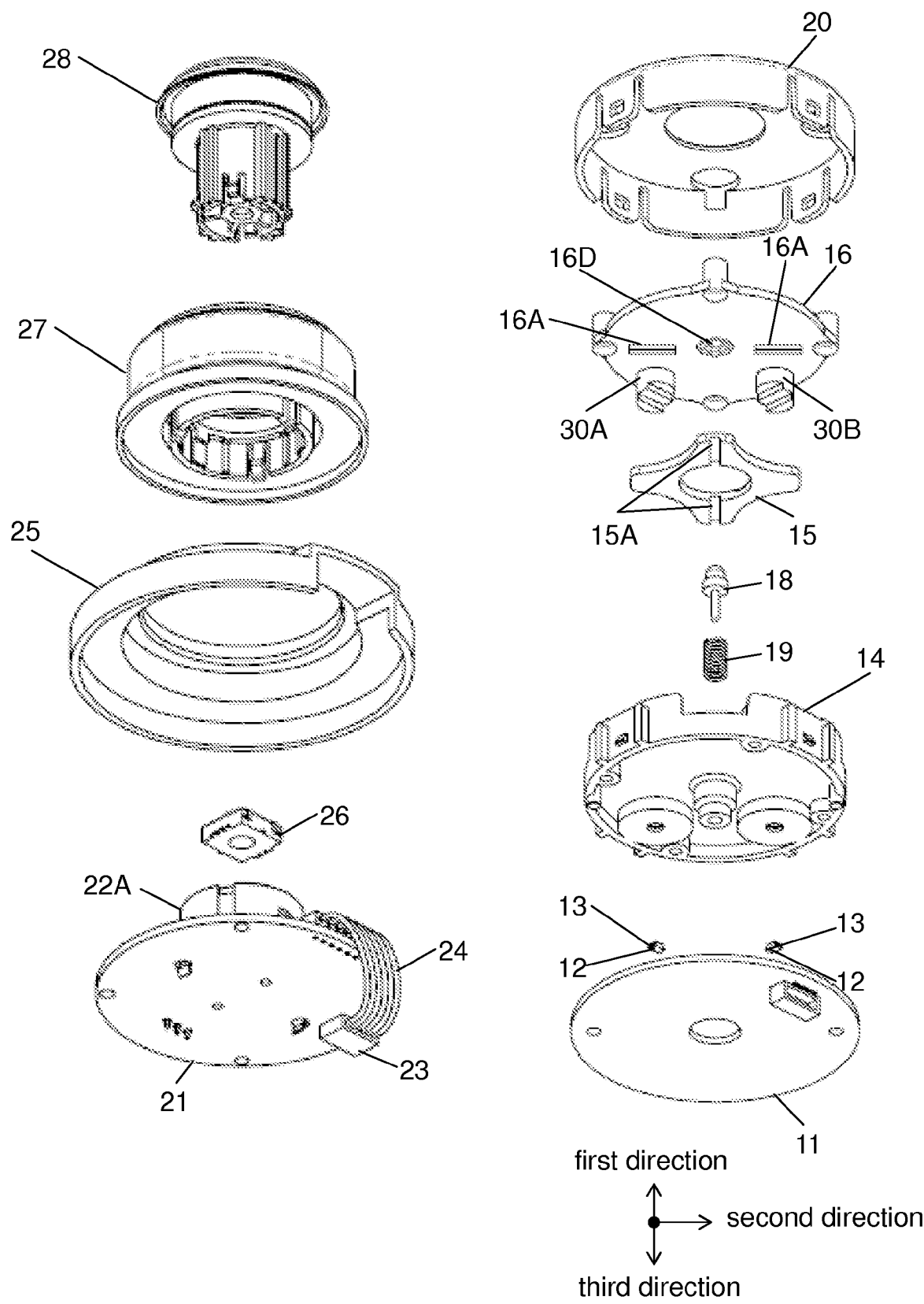
FIG. 7B is an exploded perspective view illustrating the multidirectional input device according to the second exemplary embodiment of the present invention.

A second exemplary embodiment will be described with reference to exploded perspective views of a multidirectional input device in FIGS. 7A and 7B. FIG. 7A is an exploded perspective view of the multidirectional input device viewed from diagonally above, while FIG. 7B is an exploded perspective view of the device viewed from diagonally below. The components same as those in FIG. 2 are identified by the same numerals, and the redundant description will not be made.

Although the shape of operation body 27, push button 28, and the like is slightly different between the multidirectional input device illustrated in FIG. 2 and the multidirectional input devices illustrated in other figures, the components identified by the same numerals are substantially the same.

The multidirectional input device according to the first exemplary embodiment illustrated in FIG. 2 and the multidirectional input device according to the second exemplary embodiment illustrated in FIGS. 7A and 7B are different in the following points.

In the first exemplary embodiment, only one reflection portion 17 is provided. However, in the second exemplary embodiment, two reflection portions 30A and 30B are provided. Light-emitting device 12 and light-receiving device 13 are mounted on an upper surface of lower wiring board 11 to face each of reflection portions 30A and 30B.

The reflection portion has the shape of spiral steps in the first exemplary embodiment. On the other hand, the reflection portion has a stair-like shape in a constant direction in the second exemplary embodiment.

In the present exemplary embodiment, the direction of stairs is different between reflection portion 30A and reflection portion 30B. Therefore, the direction of the sliding operation of movable member can be detected by arranging two reflection portions 30A and 30B.

Compared to reflection portion 17 having the shape of spiral steps according to the first exemplary embodiment illustrated in FIG. 3A and other figures, the number of light-emitting device 12 and light-receiving device 13 arranged to face reflection portion increases due to the arrangement of two reflection portions 30A and 30B in which each step directs in different direction. However, the area of each plane portion reflecting light from each reflection portion 30A or 30B, each having steps in different directions, can be assured to be large. Moreover, according to the exemplary embodiment, since two reflection portions 30A and 30B are used, the number of steps of the reflection portions can be reduced compared to reflection portion 17 according to the first exemplary embodiment illustrated in FIG. 3A and other figures. Accordingly, according to the exemplary embodiment, the height difference between steps is easy to be assured to be large. Accordingly, this configuration can realize the reliable detection of light by each of light-receiving devices 13 according to the multiple sliding directions including front-back direction, horizontal direction, and oblique directions of operation body 27, thereby being capable of detecting a direction with high accuracy.

The same applies to the other exemplary embodiments described below.

Third Exemplary Embodiment

Figure 8:
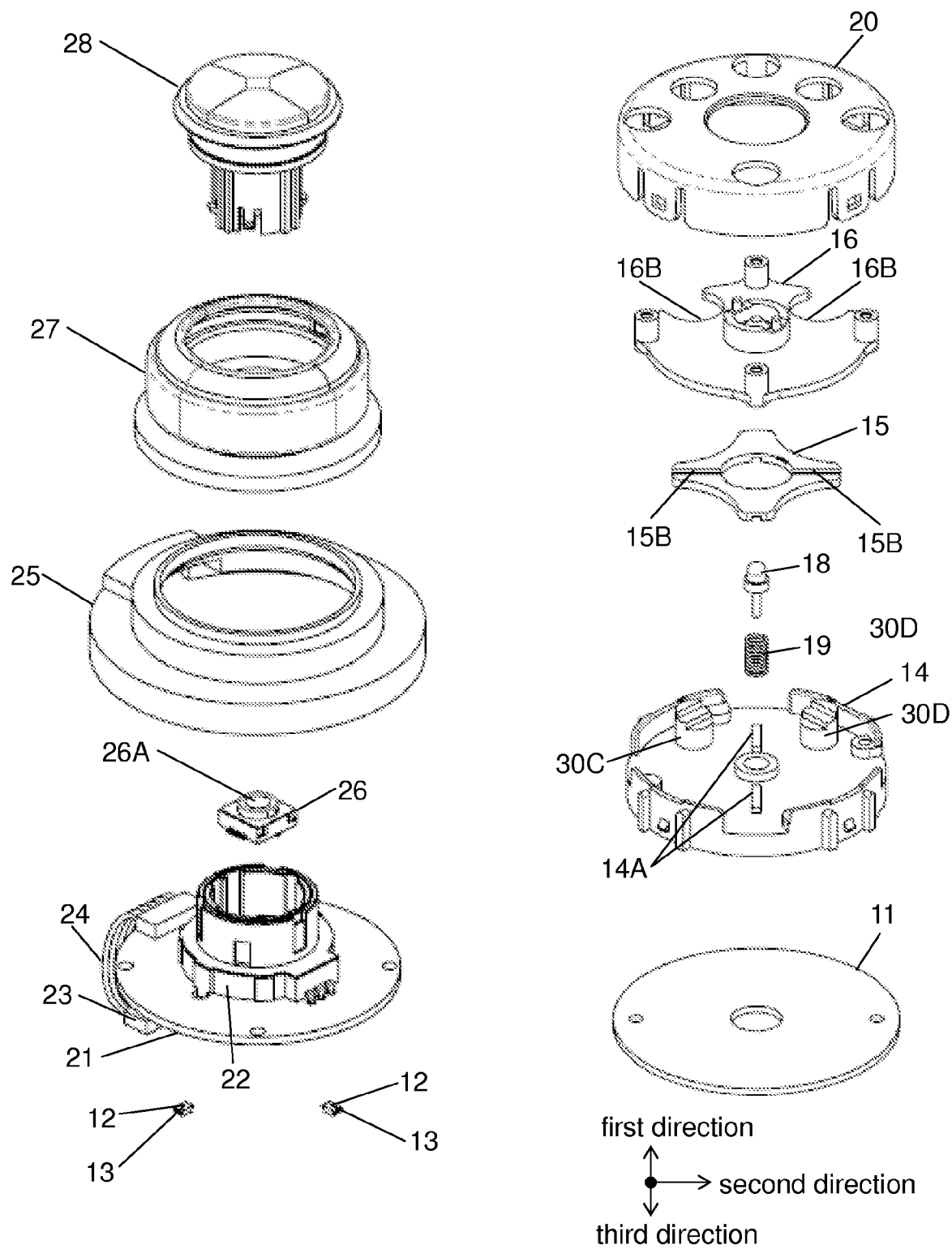
FIG. 8 is an exploded perspective view illustrating a multidirectional input device according to a third exemplary embodiment of the present invention.

A third exemplary embodiment will be described with reference to an exploded perspective view of a multidirectional input device in FIG. 8. FIG. 8 is an exploded perspective view of the multidirectional input device viewed from diagonally above, and an exploded perspective view of the device viewed from diagonally below is not illustrated. The components same as those in FIGS. 7A and 7B are identified by the same numerals, and the redundant description will not be made.

The multidirectional input device according to the second exemplary embodiment illustrated in FIGS. 7A and 7B and the multidirectional input device according to the third exemplary embodiment illustrated in FIG. 8 are different in the following points.

In the second exemplary embodiment, reflection portions 30A and 30B are provided on the lower surface of movable member 16, while reflection portions 30C and 30D are provided on the upper surface of case 14 in the third exemplary embodiment. In the present exemplary embodiment, movable member 16 has cutout 16B for preventing the contact between reflection portions 30C and 30D and movable member 16.

As in the second exemplary embodiment, light-emitting device 12 and light-receiving device 13 are mounted on the lower surface of upper wiring board 21 so as to face each of reflection portions 30C and 30D.

Fourth Exemplary Embodiment

Figure 9A:
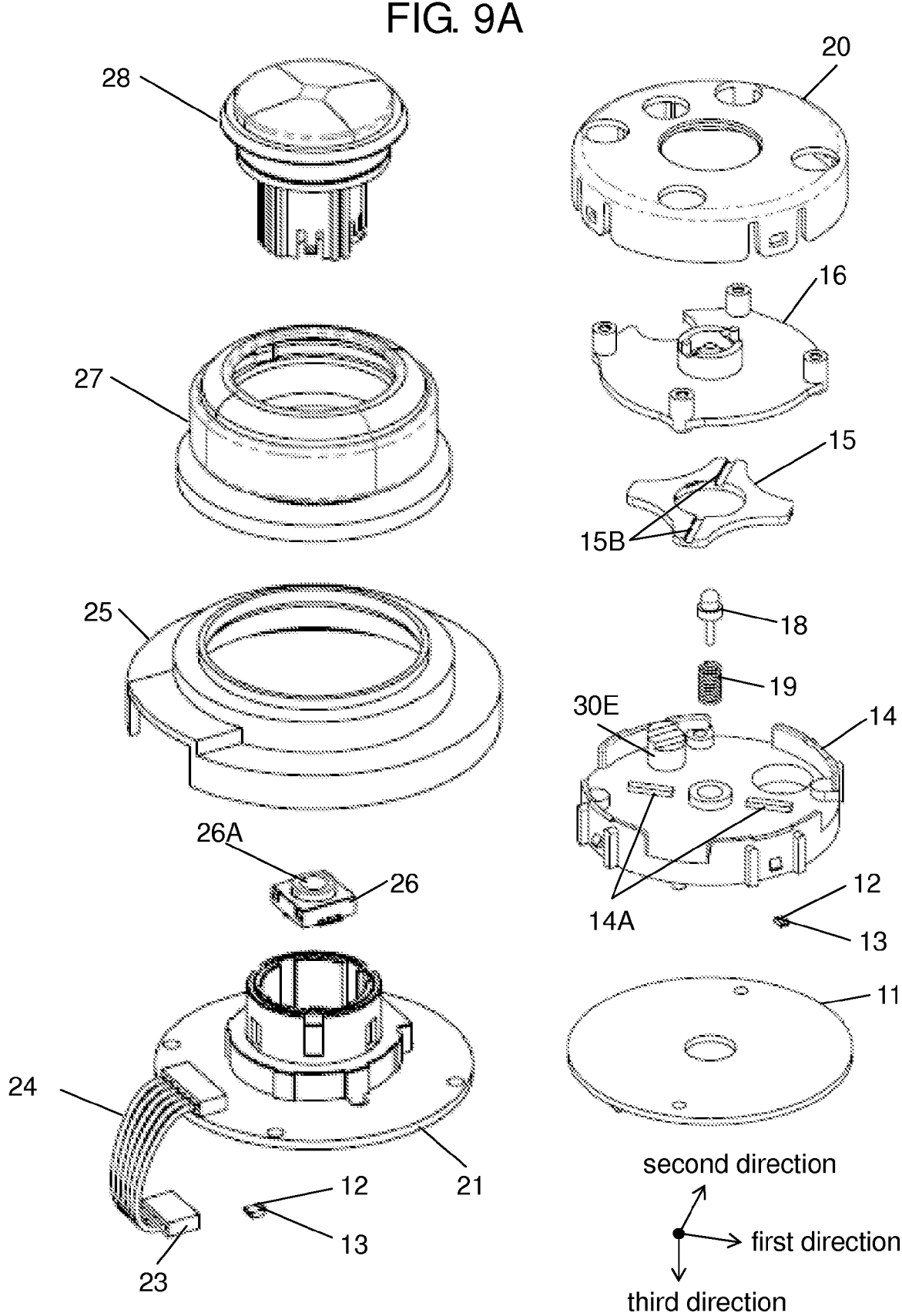
FIG. 9A is an exploded perspective view illustrating a multidirectional input device according to a fourth exemplary embodiment of the present invention.
Figure 9B:
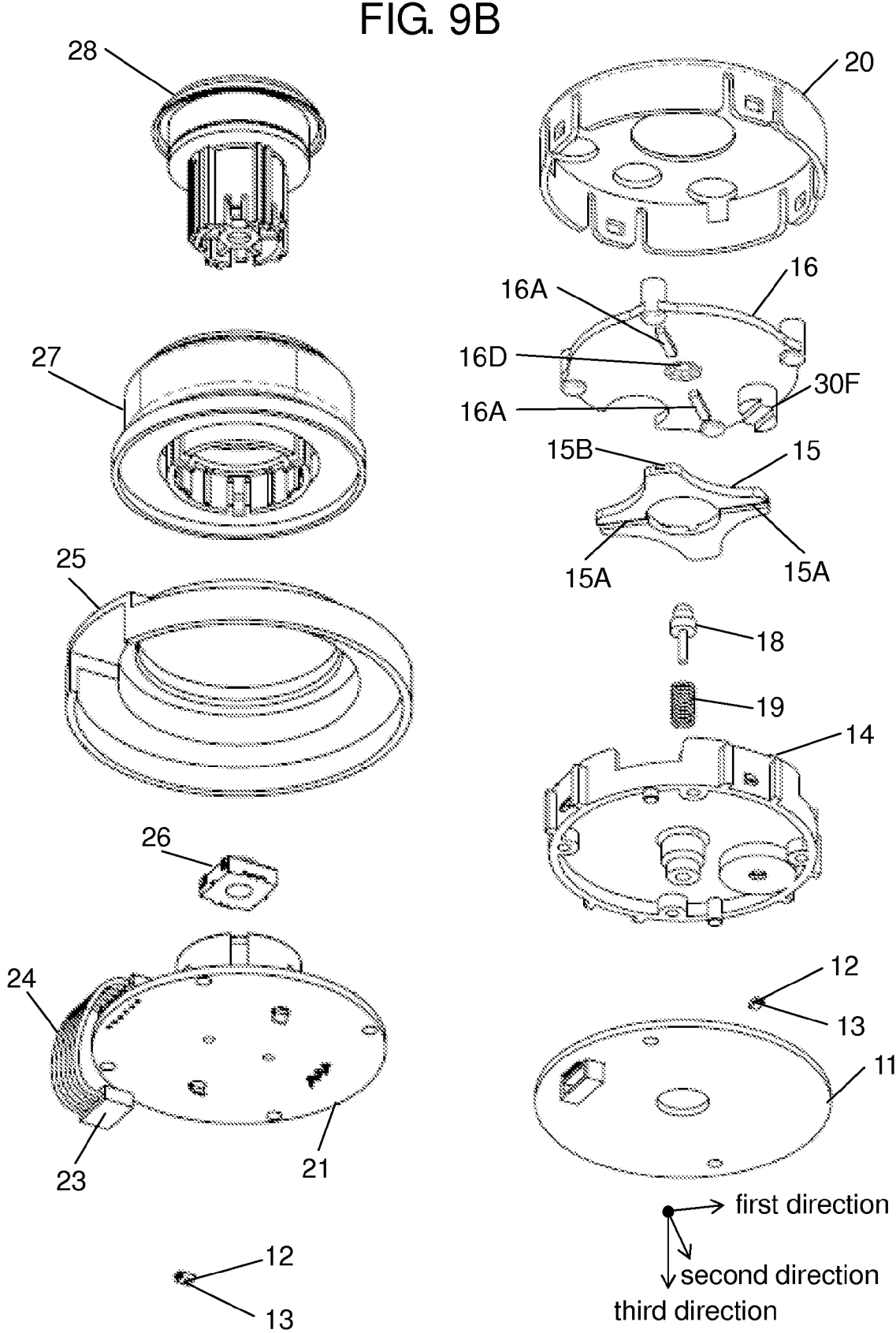
FIG. 9B is an exploded perspective view illustrating the multidirectional input device according to the fourth exemplary embodiment of the present invention.

A fourth exemplary embodiment will be described with reference to exploded perspective views of a multidirectional input device in FIGS. 9A and 9B. FIG. 9A is an exploded perspective view of the multidirectional input device viewed from diagonally above, while FIG. 9B is an exploded perspective view of the device viewed from diagonally below. The components same as those in FIG. 8 are identified by the same numerals, and the redundant description will not be made.

The multidirectional input device according to the third exemplary embodiment illustrated in FIG. 8 and the multidirectional input device according to the fourth exemplary embodiment illustrated in FIGS. 9A and 9B are different in the following points.

In the third exemplary embodiment, reflection portions 30C and 30D are provided on the upper surface of case 14, while reflection portion 30E is provided on the upper surface of case 14, and reflection portion 30F is provided on the lower surface of movable member 16 in the fourth exemplary embodiment. Specifically, in the fourth exemplary embodiment, each of two reflection portions 30E and 30F is provided on the different member.

Light-emitting device 12 and light-receiving device 13 are mounted respectively on the lower surface of upper wiring board 21 and the upper surface of lower wiring board 11 so as to face each of reflection portions 30E and 30F.

Fifth Exemplary Embodiment

Figure 10A:
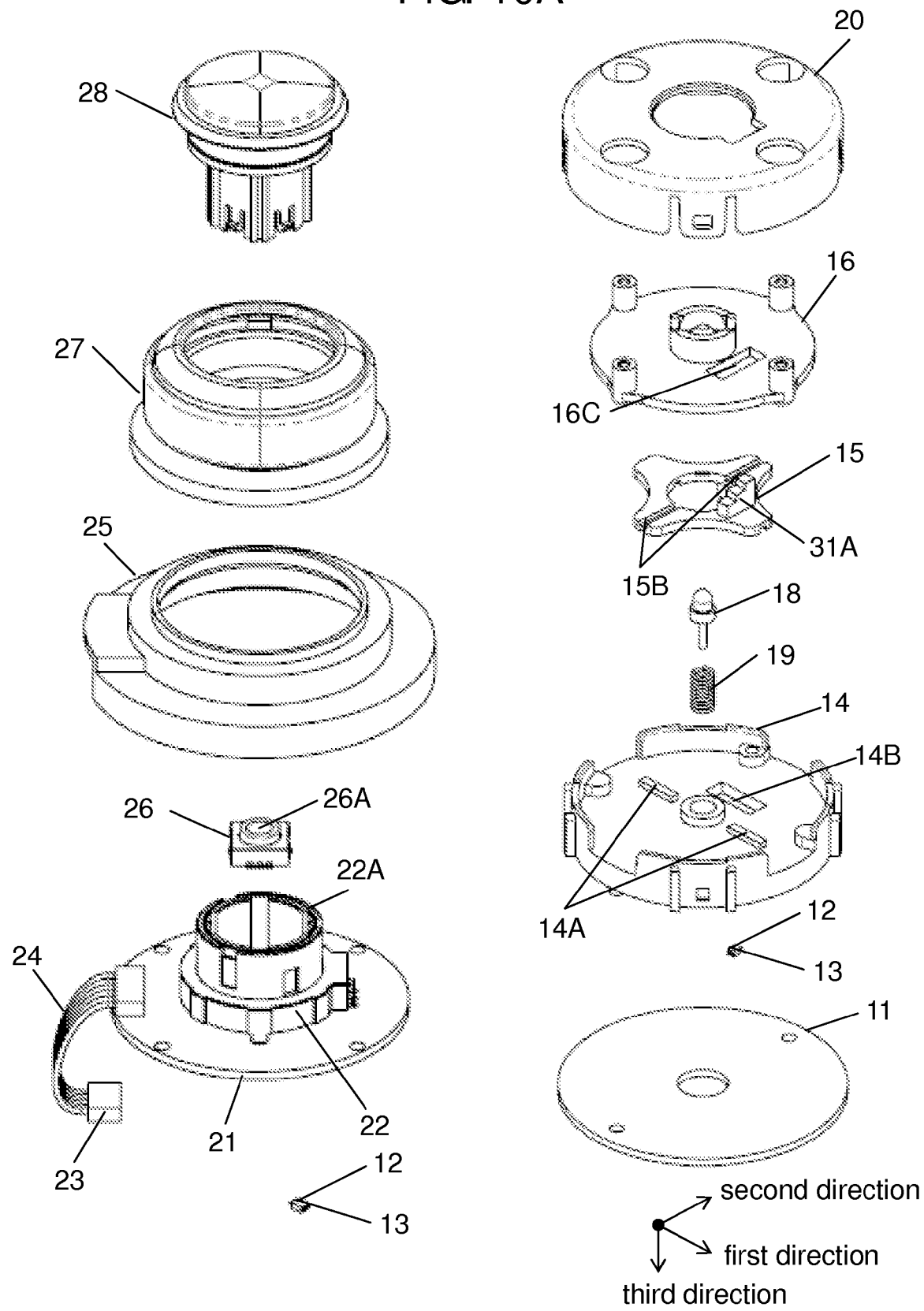
FIG. 10A is an exploded perspective view illustrating a multidirectional input device according to a fifth exemplary embodiment of the present invention.
Figure 10B:
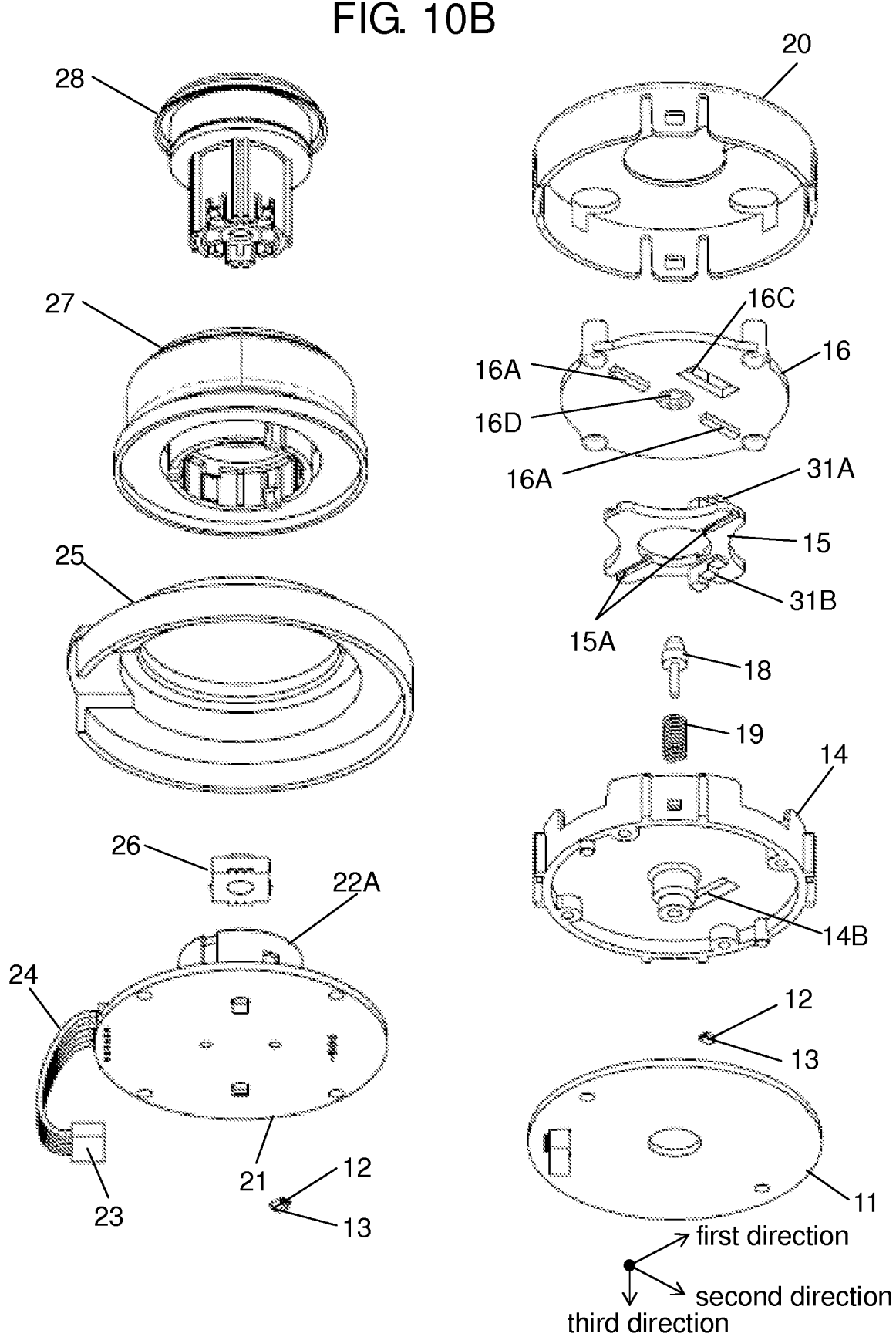
FIG. 10B is an exploded perspective view illustrating the multidirectional input device according to the fifth exemplary embodiment of the present invention.

A fifth exemplary embodiment will be described with reference to exploded perspective views of a multidirectional input device in FIGS. 10A and 10B. FIG. 10A is an exploded perspective view of the multidirectional input device viewed from diagonally above, while FIG. 10B is an exploded perspective view of the device viewed from diagonally below. The components same as those in FIG. 8 are identified by the same numerals, and the redundant description will not be made.

The multidirectional input device according to the third exemplary embodiment illustrated in FIG. 8 and the multidirectional input device according to the fifth exemplary embodiment illustrated in FIGS. 10A and 10B are different in the following points.

In the third exemplary embodiment, reflection portions 30C and 30D are provided on the upper surface of case 14, while reflection portion 31A is provided on the upper surface of slider 15, and reflection portion 31B is provided on the lower surface of slider 15 in the fifth exemplary embodiment.

Reflection portion 31A has plane portions arranged in the direction in which groove portion 15B extends, each of the plane portions having a different height. Reflection portion 31B has plane portions arranged in the direction in which groove portion 15A extends, each of the plane portions having a different height.

The reflection portion (reflection portions 30A to 30D) provided on case 14 or movable member 16 illustrated in FIGS. 7A, 7B, and 8 is circular in a plan view, while reflection portions 31A and 31B provided on slider 15 are rectangle in a plan view.

The reflection portion provided on case 14 or movable member 16 has to always have a correspondence relation with light-emitting device 12 and light-receiving device 13, even if movable member 16 slides in any direction. Therefore, the planar shape of reflection portions 30C and 30D provided on case 14 or movable member 16 illustrated in the third exemplary embodiment has to be equal to or larger than the sliding range of case 14.

On the other hand, the shape of reflection portions 31A and 31B configured in a stepwise manner in a plan view has no need to be formed to have a circular shape, but can be formed to have a rectangular shape, since slider 15 slides along groove portions 15A and 15B according to the reflection portion (reflection portions 31A and 31B) provided on slider 15.

In other words, if the reflection portion is provided on slider 15, the area of the reflection portion in a plan view can be reduced more than the case where the reflection portion is provided on case 14 or movable member 16.

As in the other exemplary embodiments, light-emitting device 12 and light-receiving device 13 are arranged to face reflection portions 31A and 31B.

Opening 16C is formed on movable member 16 for preventing reflection portion 31A from being in contact with movable member 16, and light-emitting device 12 and light-receiving device 13 are mounted on the back surface of upper wiring board 21. Opening 14B is formed on case 14 for preventing reflection portion 31B from being in contact with case 14, and light-emitting device 12 and light-receiving device 13 are mounted on the upper surface of lower wiring board 11.

The present exemplary embodiment brings the effects same as those in the other exemplary embodiments.

If two reflection portions are provided on slider 15, the sliding direction of slider 15 can surely be detected in two separate moving directions including the first direction and the second direction. Therefore, the detection of the sliding direction of operation body 27 via slider 15 can be made more accurate.

Sixth Exemplary Embodiment

Figure 11B:
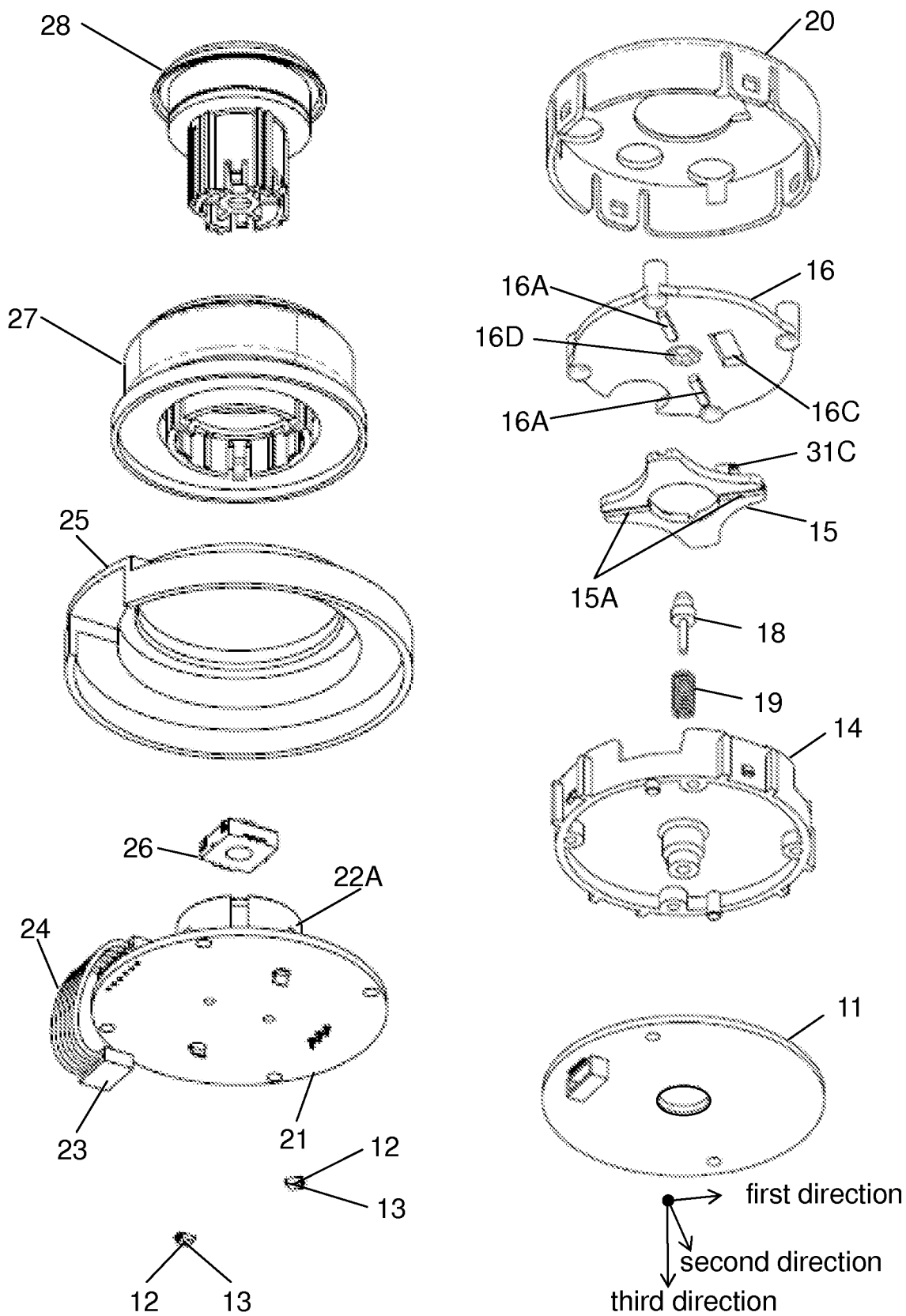
FIG. 11B is an exploded perspective view illustrating the multidirectional input device according to the sixth exemplary embodiment of the present invention.

A sixth exemplary embodiment will be described with reference to exploded perspective views of a multidirectional input device in FIGS. 11A and 11B. FIG. 11A is an exploded perspective view of the multidirectional input device viewed from diagonally above, while FIG. 11B is an exploded perspective view of the device viewed from diagonally below. The components same as those in the other exemplary embodiments are identified by the same numerals, and the redundant description will not be made.

In the present exemplary embodiment, the combination of two reflection portions is as stated below.

Reflection portion 31C same as reflection portion 31A according to the fifth exemplary embodiment illustrated in FIG. 10A is provided on the upper surface of slider 15, and reflection portion 30G same as reflection portion 30C according to the third exemplary embodiment illustrated in FIG. 8 is provided on the upper surface of case 14.

The present exemplary embodiment brings the effects same as those in the other exemplary embodiments.

Seventh Exemplary Embodiment

Figure 12:
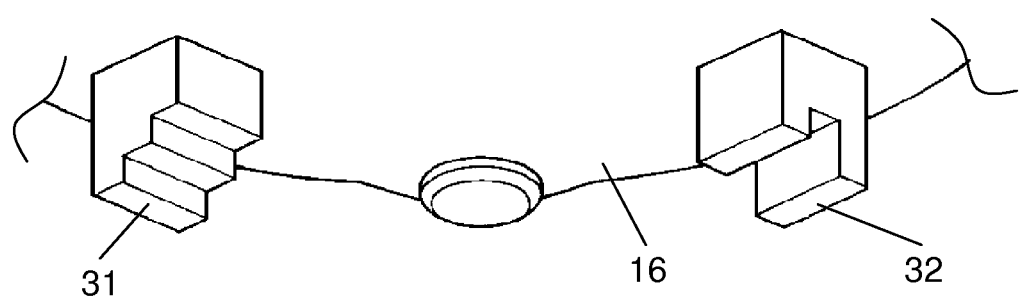
FIG. 12 is a perspective view illustrating a part of the multidirectional input device according to the exemplary embodiment of the present invention.
Figure 13:
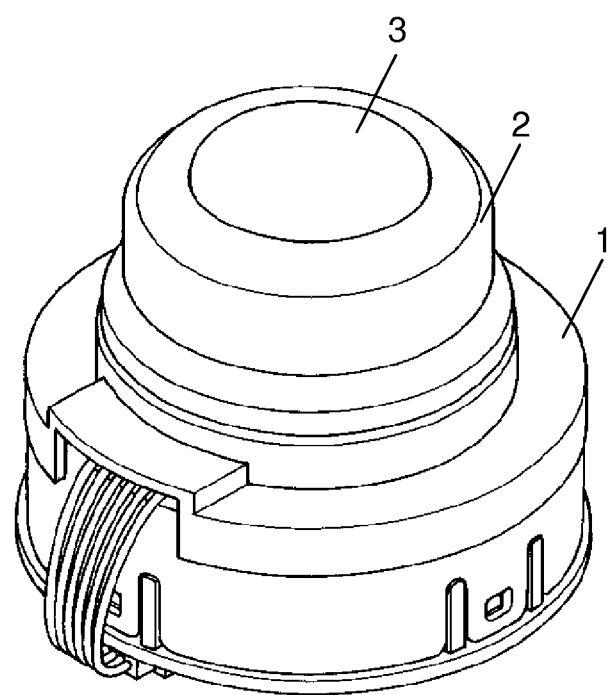
FIG. 13 is a perspective view illustrating a conventional multidirectional input device.

Another embodiment of the reflection portion will be described with reference to FIG. 12.

Reflection portion 31 is formed such that the height thereof gradually increases, while reflection portion 32 is formed such that the step increases and decreases. The effects same as those in the other exemplary embodiments can be obtained even by the shape of reflection portion 32, since the distance between reflection portion 32 and light-emitting device 12 as well as light-receiving device 13 (not illustrated in FIG. 12) is different according to an area, like reflection portion 31.

It is to be noted that reflection portion 32 formed such that the step increases and decreases is included in the stepwise reflection portion in the present invention.

Specifically, the reflection portion is not limited to have steps gradually increasing or decreasing. The reflection portion may have plural areas irregularly arranged in a constant direction, each of plural areas having a different height.

As is apparent from the above description, the distance between the reflection portion and light-emitting device 12 as well as light-receiving device 13 is different according to an area in the first to seventh exemplary embodiments. Consequently, the sliding direction of operation body 27 can be detected.

It has been described above that a desired menu is selected by moving the cursor or pointer displayed on the liquid crystal display panel in the operation direction on the plural menus by the sliding operation of operation body 27. However, the present invention can be used for various operations of devices, such as scrolling a map by sliding operation body 27 with the map being displayed on the liquid crystal display panel.

In the exemplary embodiments described above, light-emitting device 12 and light-receiving device 13 are formed integrally. However, it is not always necessary to form a pair of light-emitting device 12 and light-receiving device 13 to be integral with each other.

The present invention can also be embodied by the configuration in which a control unit such as a microcomputer is provided on lower wiring board 11, and light-receiving device 13 is connected to the control unit to detect the sliding direction of operation body 27 or movable member 16 by the control unit from a voltage from light-receiving device 13.

According to the exemplary embodiments, the sliding direction of movable member 16 can be detected by a pair of light-emitting device 12 and light-receiving device 13 by arranging light-emitting device 12 and light-receiving device 13 to face the reflection portion (17, etc.) having steps. This configuration simplifies the structure of the multidirectional input device with reduced number of components. In addition, this can provide a multidirectional input device that can realize a reliable operation even after a long-term use and frequent use, since the multidirectional input device can make detection in a non-contact manner by reflected light from the reflection portion (17, etc.).

INDUSTRIAL APPLICABILITY

The multidirectional input device according to the present invention can realize various and reliable operations with a simple configuration. The multidirectional input device according to the present invention is useful for operating various electronic devices in an automobile.

What is claimed is:

1. A multidirectional input device comprising:
   a case;
   a slider slidable in a first direction and mounted to the case;
   a movable member mounted on an upper surface of the slider so as to be slidable in a second direction;
   a first reflection portion provided on any one of the movable member, the case, and the slider;
   a first light-emitting device arranged to be opposite to the first reflection portion; and
   a first light-receiving device arranged to be opposite to the first reflection portion,
   wherein the first reflection portion has a plurality of steps confronting the first light-emitting device, and
   a distance between the first reflection portion and the first light-emitting device in a third direction varies depending on an area.

2. The multidirectional input device according to claim 1, wherein the first reflection portion is formed to have a plurality of areas radially arranged about a predetermined position, each of the plurality of areas having a different height in the third direction.

3. The multidirectional input device according to claim 1 further comprising:
   a second reflection portion;
   a second light-emitting device arranged to be opposite to the second reflection portion; and
   a second light-receiving device arranged to be opposite to the second reflection portion,
   wherein the second reflection portion has a plurality of steps confronting the second light-emitting device, and
   a distance between the second reflection portion and the second light-emitting device in the third direction varies depending on an area.

4. The multidirectional input device according to claim 3, wherein the first reflection portion is provided on the slider, and
   the first reflection portion has a plurality of steps having a different height in the third direction along the first direction or the second direction.

5. The multidirectional input device according to claim 1, wherein the first light-emitting device and the first light-receiving device are formed integrally with each other.

* * * * *